D. EPPELSHEIMER.
METALLURGICAL MASS.
APPLICATION FILED NOV. 26, 1917.

1,290,143.

Patented Jan. 7, 1919.

Witness:
Geo. Johnson

Daniel Eppelsheimer
Inventor by James W. See
Attorney

UNITED STATES PATENT OFFICE.

DANIEL EPPELSHEIMER, OF MIDDLETOWN, OHIO.

METALLURGICAL MASS.

1,290,143.  Specification of Letters Patent.  Patented Jan. 7, 1919.

Application filed November 26, 1917. Serial No. 203,886.

*To all whom it may concern:*

Be it known that I, DANIEL EPPELSHEIMER, a citizen of the United States, residing at Middletown, Butler county, Ohio, have invented certain new and useful Improvements in Metallurgical Masses, of which the following is a specification.

My present invention pertaining to metallurgical masses relates to such an association of metal and carbon as to facilitate the economy and rapidity with which the metal, as iron, may be melted down in an open-hearth furnace. The invention will be readily understood from the following description taken in connection with the accompanying drawing in which:—

Figure 1:
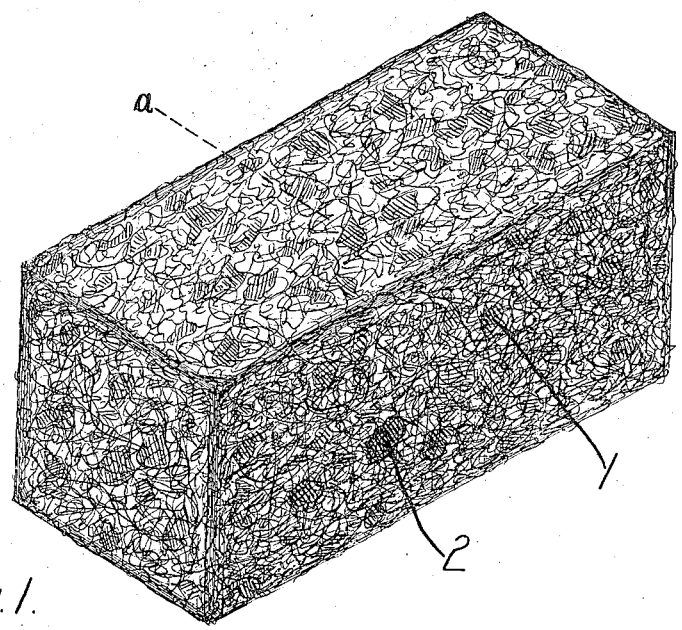
Figure 2:
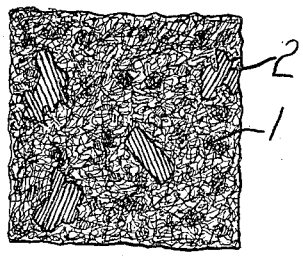

Figure 1, is a perspective view illustrative of the improved metallurgical mass in rectangular bale form: and Fig. 2 a transverse section of the same in the plane of line $a$ of Fig. 1.

In the drawing, 1 indicates a porous mass of iron or steel, and 2 indicates smaller masses of carbon held within the body of the porous mass of iron.

The porous mass of iron or steel may be formed by compacting a mass of iron or steel scrap by means of a baling press, and the mass of carbon may consist of lumps of coke held within the mass of scrap, the coke being charged into the baling press along with the scrap. The degree of compactness of the mass must be sufficient to grip and hold the masses of carbon, but must not be sufficient to prevent the access of air and gases to the confined coke.

When such a composite mass is charged into an open-hearth furnace, for instance, the metal and the carbon become subjected simultaneously to the melting operation, and there is a prevention of the undesired floating of carbon masses into association with each other to deprive the metal of its desired carbon while melting, and a prevention of the burning of floating assembled bodies of carbon with the consequent waste of carbon and destruction of furnace.

I claim:—

A metallurgical mass comprising, a porous air-charged mass of metal having masses of carbon held within it; substantially as set forth.

DANIEL EPPELSHEIMER.

Witnesses:
 JASPER B. ALTIC,
 W. B. TOBIN.